Nov. 15, 1966 — R. L. HENRY — 3,286,127
ELECTRIC DISCHARGE MACHINING APPARATUS
WITH CURRENT CONTROL MEANS
Filed May 18, 1961
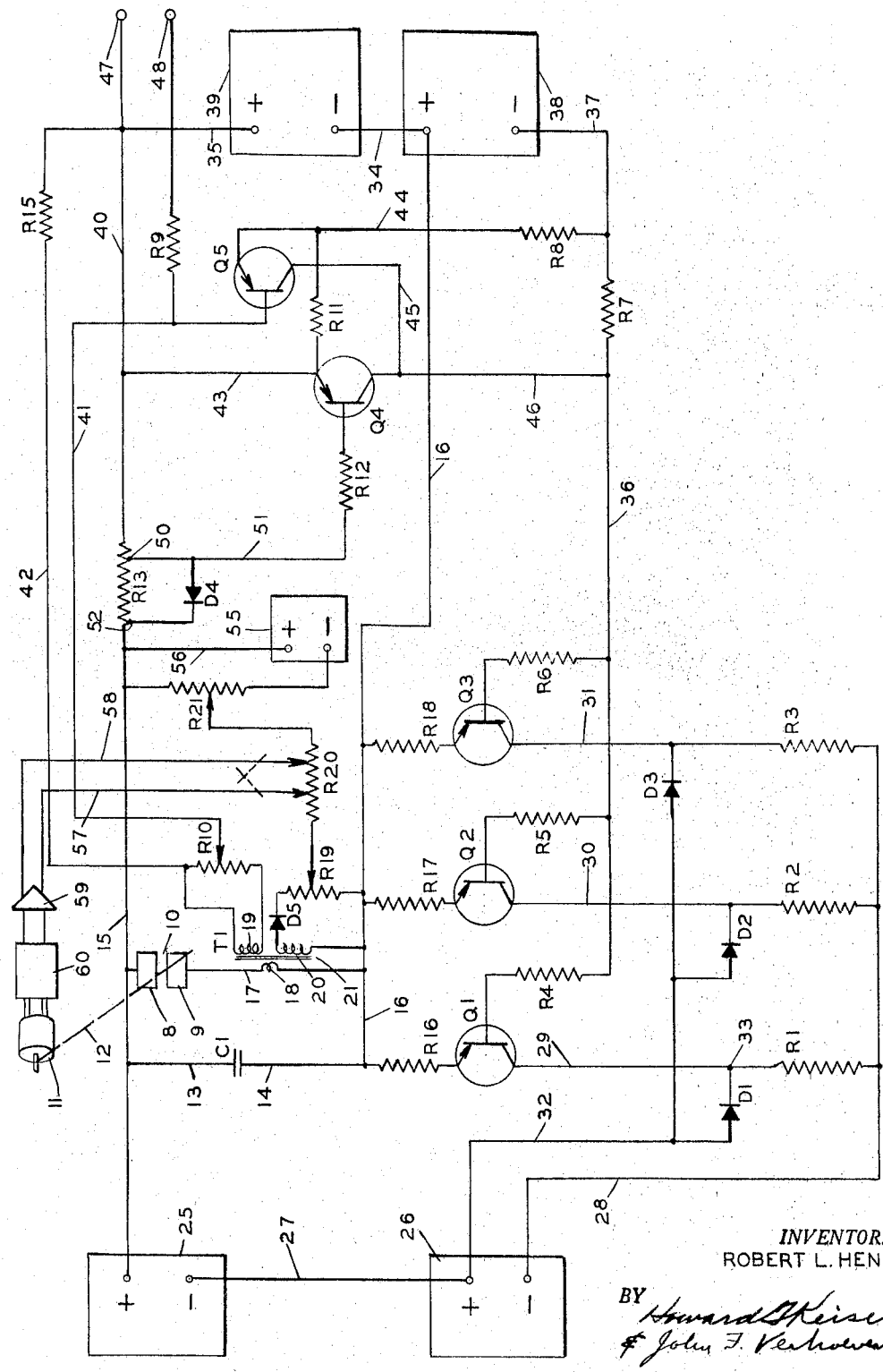
*INVENTOR.*
ROBERT L. HENRY
BY Howard S. Keiser
& John F. Verhoeven
ATTORNEYS

United States Patent Office 3,286,127
Patented Nov. 15, 1966

3,286,127
ELECTRIC DISCHARGE MACHINING APPARATUS WITH CURRENT CONTROL MEANS
Robert L. Henry, Cincinnati, Ohio, assignor to The Cincinnati Milling Machine Co., Cincinnati, Ohio, a corporation of Ohio
Filed May 18, 1961, Ser. No. 117,256
12 Claims. (Cl. 315—209)

This invention relates to spark machining apparatus of the kind wherein a series of disruptive electric spark discharges are established between a tool electrode and a workpiece while the parts are immersed in a fluid dielectric such as oil, kerosene, etc. The sparks are produced by applying an electric potential across the gap between the tool and the workpiece which is of sufficient magnitude to ionize the dielectric fluid and cause a spark discharge to occur. Thereafter, the gap is permitted to de-ionize after which another spark is produced, and so on, so that a series of high-frequency sparks is established between the tool and the workpiece. Normally, a capacitor is connected between the tool and the workpiece, the capacitor being charged by the source of electrical energy connected across the gap and being discharged each time a spark spans the gap between the tool and the workpiece.

One of the simplest types of electro-discharge machining circuits, and also one of the most effective, is the so-called RC, or relaxation oscillator circuit. However, to obtain satisfactory operation with this type of circuit, it is necessary to overcome the tendency of the spark discharge to be prolonged into an arc discharge through continued ionization of the gap. This is due to the fact that an arc discharge produces excessive heating of the workpiece thereby spoiling the surface finish of the work and also debasing the structure of the metal in the region of the "burn."

Accordingly, one of the objects of the present invention is to provide a spark discharge machining apparatus in which the charging circuit is effectively disconnected from the gap after the spark has been initiated thereby eliminating any possibility of the spark being prolonged into an arc. This control is effected by one or more transistors connected in series with the charging circuit, which transistors are turned off and on in accordance with changes in the current flow through the gap.

Another object of the invention is to provide a spark discharge machining apparatus having a new type of charging circut which is uniquely adapted for use with series-connected switching transistors.

Another object of the invention is to provide a spark discharge machining apparatus having improved means for disconnecting the charging circuit when a "short" occurs in the gap and for clearing the "short" while the charging circuit is thus disconnected.

Another object of the invention is to provide a spark discharge machining apparatus having a new and improved servo-feed control circuit which permits faster and smoother operation of the servo-feed mechanism that regulates the spacing between the tool and the workpiece.

With these and other objects in view, which will become apparent from the following description, the invention includes certain novel features of construction and combinations of parts, the essential elements of which are set forth in the appended claims, and a preferred form or embodiment of which will hereinafter be described with reference to the drawing which accompanies and forms a part of this specification.

The single figure of the drawing is a schematic view of the improved electro-discharge machining control circuit.

The electro-discharge machining apparatus, to which the present invention applies, includes a machine structure (not shown) which serves to support a tool and a workpiece for relative movement toward and from one another to permit variation of the spacing therebetween. Reference may be had to the U.S. patent to Oezer, 2,807,706, or to the U.S. patent to Martellotti, 2,773,968, for a disclosure of this portion of the apparatus.

In the circuit shown in the figure, the tool and workpiece are represented by electrodes 8 and 9 which are separated by a gap 10. The width of the gap is controlled by a servo motor 11 which has a driving connection with either the tool or the workpiece to effect relative movement therebetween. This connection is represented on the drawing by the dashed line 12 and may constitute any suitable type of driving connection between the motor shaft and the machine slide.

Charging circuit

The circuit for impressing a potential difference across the gap 10, i.e., the charging circuit of the apparatus, is of the RC type in which a capacitor $C_1$ is charged through a series of parallel connected impedances including resistors $R_1$, $R_2$, and $R_3$, transistors $Q_1$, $Q_2$, and $Q_3$, and resistors $R_{16}$, $R_{17}$, and $R_{18}$. The capacitor $C_1$ is connected across the gap 10 by leads 13 and 14 which are connected to conductors 15 and 16, respectively. The electrode 8 is connected directly to conductor 15 while electrode 9 is connected to the conductor 16 by a wire 17 and the primary winding 18 of a transformer $T_1$. This transformer also has two secondary windings 19 and 20, the purpose of which will hereinafter be described. The transformer is preferably made in the form of a toroid with a ferrite core 21 on which the windings are wound in a known manner. The primary winding may be comprised of a few turns of wire wrapped around the core or, it may be formed by simply passing the wire 17 through the "window" of the core 21.

Charging current for the capacitor $C_1$ is obtained from a pair of direct-current power supplies 25 and 26 which are shown herein as separate units. It will be appreciated, however, that a single power supply with an intermediate voltage tap could be provided in lieu thereof. While the voltage supplied by the units 25 and 26 may be varied to suit the requirements of the particular application for which the equipment is designed, in the present instance the voltage delivered to the terminals of the supplies 25 and 26 is approximately 40 and 25 volts, respectively.

As indicated in the figure, the positive terminal of power supply 25 is connected to the conductor 15 while the negative terminal thereof is connected by a conductor 27 with the positive terminal of the supply 26. The negative terminal of this supply is connected by a conductor 28 with one end of each of the resistors $R_1$, $R_2$, and $R_3$. The opposite ends of the resistors $R_1$, $R_2$, and $R_3$, are connected by conductors 29, 30 and 31 to the collector electrodes of transistors $Q_1$, $Q_2$, and $Q_3$. The emitter electrodes of the transistors are connected by resistors $R_{16}$, $R_{17}$, and $R_{18}$ to the conductor 16 which connects with the lead 14 of capacitor $C_1$.

For the sake of discussion, it will be convenient to consider only one of the paths from conductor 28 to conductor 16 since the additional paths are provided simply for the purpose of increasing the current handling capability of the charging circuit. Thusly viewed, the potential provided by the supplies 25 and 26 is applied across the series combination of resistor $R_1$, transistor $Q_1$, resistor $R_{16}$, and capacitor $C_1$ so as to charge the capacitor. In this circuit, the resistor $R^{16}$, is a bias stabilization resistor and its resistance is considerably less than that of the main charging resistor $R_1$. The function of the latter resistor is to limit the current flow through the transistor when it is turned on with the capacitor $C_1$ discharged. In other words, this resistor is connected in series with the transistor $Q_1$ to prevent the entire voltage drop provided by the power supply from occurring across the transistor when it is turned on with the capacitor completely discharged. This is necessary in order to prevent the destruction of the transistor by the excessively high current which would flow therethrough if there were no resistance connected in the circuit to prevent it.

It is also important, insofar as the life of the transistor is concerned, to keep the high voltage off of the transistor when it is switched on and off. For this purpose, the positive terminal of the power supply 26 is connected by a conductor 32 and a diode $D_1$ with the conductor 29, the point of juncture being indicated by reference numeral 33. The diode $D_1$ is so poled as to permit current to flow from the power supply 26 through the resistor $R_1$ at all times regardless of the conductive or non-conductive state of the transistor $Q_1$. Hence, the voltage drop across the resistor $R_1$ will always be equal to the potential provided by the power supply 26 and the potential of the junction 33 will never be greater than 40 volts negative with respect to the positive terminal of power supply 25. Hence, this circuit affords the advantage that a charging potential of 64 volts is available across the resistor-capacitor combination $R_1$, $C_1$ to provide rapid charging of the capacitor while, at the same time, limiting the maximum voltage which can be impressed across the transistor $Q_1$ to 40 volts.

The same considerations apply to the corresponding circuits for transistors $Q_2$ and $Q_3$ and, accordingly, diodes $D_2$ and $D_3$ are therefore provided between the conductor 32 and the conductors 30 and 31. In these circuits, the resistors $R_{17}$ and $R_{18}$ have the same function as the resistor $R_{16}$, namely, to provide bias stabilization. The degenerative action of these resistors is helpful not only in stabilizing the saturation current of the transistors, but also in helping to equalize the load distribution between the several transistors. It might here be noted that, with the present apparatus, the current handling capacity of the circuit can be increased to whatever extent desired by simply adding additional transistors along with their associated circuitry.

The base electrodes of the transistors $Q_1$, $Q_2$, and $Q_3$ are connected by current limiting resistors $R_4$, $R_5$, and $R_6$ with a conductor 36 which is connected by a resistor $R_7$ and a conductor 37 with the negative terminal of a direct current power supply 38. The positive terminal of this supply is connected with the conductor 16 whereby a forward bias is applied to each of the transistors so as to normally maintain them in a conducting state. The voltage provided by the power supply 38 is sufficient to bias the transistors to saturation despite the voltage drop which occurs in resistors $R_4$, $R_5$, and $R_6$ and resistor $R_7$ due to base current flow.

As shown in figure, an additional direct-current power supply 39 is connected in series by conductors 34 and 35 between the positive terminal of supply 38 and a conductor 40 which is connected by a resistor $R_{13}$ with the conductors 15. The purpose of the power supply 39 will become apparent as the description proceeds.

Dynamic cut-off control

In the present circuit, means is provided for turning the power transistors $Q_1$, $Q_2$ and $Q_3$ off and on in accordance with changes in the current flow through the gap 10. For this purpose, a control transistor $Q_5$ is provided which is turned on and off under the influence of the voltage developed across the secondary winding 19 of transformer $T_1$. The end terminals of the winding 19 are connected across the winding of a potentiometer $R_{10}$, the slider of which is connected by a conductor 41 with the base electrode of the transistor $Q_5$. As shown in the figure, the upper end of the winding of potentiometer $R_{10}$ is connected by a conductor 42 and a current limiting resistor $R_{15}$ with the conductor 40. This conductor is connected by a conductor 43, a resistor $R_{11}$, and a conductor 44 with the emitter electrode of the transistor $Q_5$. Hence, the voltage developed across the potentiometer $R_{10}$ is applied across the base and emitter electrodes of the transistor. The collector electrode of transistor $Q_5$ is connected by conductors 45 and 46 with the conductor 36. Current flow through the transistor, when it is in a conducting state, is from the positive terminal of power supply 39 through conductors 35, 40 and 43, resistor $R_{11}$, emitter and collector electrodes of the transistor, conductors 45 and 46, resistor $R_7$ and conductor 37 to the negative terminal of power supply 38. Under this condition, that is when the transistor is turned on, the voltage drop across the transistor $R_7$ is sufficient to raise the potential of conductor 36 to a point above that of the conductor 16 so that the base electrodes of the power transistor $Q_1$, $Q_2$, and $Q_3$ are positive with respect to the emitters thereof so that the transistors will be turned off.

The transistor $Q_5$ is normally maintained in a non-conducting state by a negative bias applied thereto by a voltage dividing network comprised of resistors $R_{11}$ and $R_8$ which are connected in series between the positive and negative terminals of the combined power supplies 38 and 39. Hence, the emitter electrode of the transistor will be somewhat less positive than the positive terminal of the power supply 39 due to the voltage drop across the resistor $R_{11}$. The base electrode, on the other hand, will in the absence of any potential developed across the potentiometer $R_{10}$, be at the same potential as the positive terminal of the supply 39. Hence, a reverse bias will be applied to the transistor to keep it turned off. The resistor $R_{11}$ also functions as a bias stabilization resistor for the transistor $Q_5$.

The winding 19 is so connected to the potentiometer $R_{10}$ that the upper end of the potentiometer will be more positive than the lower end when the current through the primary winding of the transformer is increasing. Thus, when a spark discharge occurs across the gap 10, the current flowing through the primary winding of the transformer will increase and apply a forward bias to the transistor $Q_5$ thereby turning it on and turning off the power transistors. The capacitor $C_1$ will thereby be cut free from the charging circuit so that the only energy available to the gap is that from the capacitor $C_1$. Hence, continued current flow from the charging circuit cannot bring about prolonged arcing through the gap. When the spark is extinguished, the current flow through the primary winding of transformer $T_1$ will decrease thereby reversing the potential applied across the potentiometer $R_{10}$ whereby a reverse bias will be applied to the transistor $Q_5$. The transistor will thereby be rendered non-conducting and apply forward bias to the transistors $Q_1$, $Q_2$, and $Q_3$ so as to again connect the charging circuit to the capacitor $C_1$ for recharging the same.

In the present circuit, provision is made for connecting an external source of triggering voltage to the transistor $Q_5$ in place of the voltage derived from the transformer $T_1$. For this purpose there is provided a pair of terminals 47 and 48 which may be connected to a multivibrator or other suitable external source of voltage pulses. The terminal 47 is connected to the conductor 40 while the terminal 48 is connected to the base electrode of transistor $Q_5$ through a current limiting resistor $R_9$. Accordingly, each time the terminal 48 is pulsed negative with respect to the terminal 47, the transistor $Q_5$ will be turned on and cut off the power transistors $Q_1$, $Q_2$ and $Q_3$. Conversely, each time the pulse is removed therefrom, the transistor $Q_5$ will be biased off and turn on the power transistors.

Short circuit cut-off control

The electro-discharge machining apparatus herein disclosed also includes an improved means for clearing "shorts" in the gap 10 as may be caused by a particle of metal bridging the gap between the electrodes, or by actual touching of high points on the surfaces of the opposing electrodes. In this connection it is to be noted that the negative terminal of the power supply 39 is connected by the conductor 16 with the wire 17 and electrode 9, while the positive terminal of the power supply is connected through conductors 35 and 40, resistor $R_{13}$ and conductor 15 with the electrode 8. In the normal operation of the spark discharge machining apparatus, the extinguishing potential of the gap will be in the range of from 8 to 10 volts. The voltage of the power supply 39 is made somewhat less than this voltage say, for example, 6 volts. Hence, during normal operation of the equipment, the voltage drop across the resistor $R_{13}$ is such that the left hand end of the resistor, as viewed in the figure, is more positive than the right hand end by several volts. The resistor $R_{13}$ is provided with a tap 50 which is connected by a conductor 51 and a current limiting resistor $R_{12}$ with the base electrode of a control transistor $Q_4$. The emitter electrode of this transistor is connected by the conductor 43 with the conductor 40 so that the emitter is normally maintained somewhat less positive than the base during normal operating conditions. This maintains the transistor in a non-conducting state until a short occurs in the gap 10 whereupon the potential of electrode 8 and conductor 15 becomes equal to that of the negative electrode of the power supply 39. The supply 39 is thereby effectively connected across the resistor $R_{13}$, and the polarity of the voltage drop across the resistor is reversed. In other words, the right hand end of the resistor is now more positive than the left hand end and a forward bias is applied to the transistor $Q_4$ which causes it to conduct current from the positive terminal of power supply 39, through conductors 35, 40 and 43, emitter and collector electrodes of the transistor, conductor 46, resistor $R_7$ and conductor 37 to the negative terminal of power supply 38. Hence, the voltage drop across resistor $R_7$ will be sufficiently great to raise the potential of conductor 36 above that of conductor 16 so that the power transistors will be cut off. This will stop current flow through the gap 10 and prevent undue heating of the workpiece due to the short circuited condition of the gap.

It will be noted that the resistor $R_{13}$ is provided with a second tap 52 and that a diode $D_4$ is connected between the taps 50 and 52. This is a silicon diode and possesses the characteristic of conducting only an insignificant amount of current until the potential across the diode is in the neighborhood of one volt or so. The diode then commences to conduct heavily and thereafter maintains approximately a constant voltage drop thereacross as the current increases. As shown in the figure, the tap 50 is placed near the right hand end of the resistor $R_{13}$ while the tap 52 is provided close to the left hand end thereof. Hence, the diode $D_4$ is connected across the major portion of the resistance of the resistor. This arrangement has two effects, the first being that the resistor is thereby given a non-linear characteristic. This results from the fact that, as the difference in potential across the terminals of the resistor is increased, the resistance of the combined resistor and diode will at first be equal to the total resistance of the resistor until the voltage drop is somewhat greater than one volt whereupon the diode will begin to conduct and thereafter the resistance of the unit will become quite small. This has the effect of decreasing the potential of the tap 50 quite rapidly after the diode starts to conduct thereby quickly turning on the transistor $Q_4$ so as to cut off positively the power transistors $Q_1$, $Q_2$, and $Q_3$. The second effect of the combined resistor and diode construction is that it permits increased current to flow from the power supply 39 through the gap 10 when the latter is short circuited. In those cases where the short circuit is caused by a small particle or point of metal making point contact under very light pressure, a sufficient amount of heat will be created at the point of contact to soften or melt the connection and clear the gap without any retraction of the tool to increase the gap spacing. This steadies the action of the servo-feed device and prevents the frequent and continued withdrawal and reentry of the tool into the workpiece as sometimes occurs with certain jobs. As soon as the short is cleared, the voltage across the gap will become equal to the voltage provided by the power supply 39 and the forward bias will be removed from the transistor $Q_4$. Hence, the transistor will return to its non-conductive state and turn on the power transistors.

Servo-feed control

As heretofore noted, the transformer $T_1$ is provided with a secondary winding 20, one end of which is connected to the conductor 16 and the other end of which is connected through a diode $D_5$ to the upper end of a potentiometer $R_{19}$. The lower end of the potentiometer winding is connected to the conductor 16, and the slider thereof is connected through a potentiometer winding $R_{20}$ to a slider on a potentiometer $R_{21}$. One end of this potentiometer is connected to the conductor 15 while the other end thereof is connected to the negative terminal of a direct current power supply 55. The positive terminal of a power supply is connected by a conductor 56 to the conductor 15. The power supply 55 provides a source of reference voltage, a desired value of which may be selected by the slider of the potentiometer and delivered to one end of the winding of potentiometer $R_{20}$. It will be noted that changes in the current flowing through the primary winding of transformer $T_1$ will induce a voltage in the winding 20. The diode $D_5$ is poled so that the current flow resulting from this voltage can only traverse the potentiometer $R_{19}$ in a direction to render the upper end of the potentiometer positive with respect to the lower end thereof. Since the difference in potential between the conductor 15 and the conductor 16 is equal to the gap voltage, and since the potential developed across the potentiometer $R_{19}$ is arranged in a sense to reduce the voltage difference between conductor 15 and the slider of potentiometer $R_{19}$, the result is that the difference between the gap voltage and the current responsive voltage is applied to the left hand end of potentiometer $R_{20}$ and balanced against the reference voltage applied to the right hand end thereof. A desired portion of the resultant of these three voltages is selected by the ganged sliders of the sensitivity setting potentiometer $R_{20}$ and transmitted by conductors 57 and 58 to a servoamplifier 59. The resultant error signal is there amplified and delivered to a transducer 60 which may, for example, take the form of an electro-hydraulic valve for operating the hydraulic motor 11 in accordance with the arrangement shown in U.S. Patent No. 2,807,706 granted September 24, 1957 on an application filed by John J. Oezer.

From the foregoing it will be observed that since the current responsive signal obtained from the potentiometer $R_{19}$ is connected in series opposition with the gap voltage, therefore, for a given gap voltage, the slider of potentiometer $R_{21}$ can be set nearer the positive end of its winding than it could be the current responsive signal was not present. Therefore, when the tool is above the work, i.e., out of the cut, a higher voltage will be available to move the tool into the work. Also, when a short develops in the gap 10, the voltage across the gap will drop to zero, the current responsive signal from potentiometer $R_{19}$ will drop to zero, and the voltage from potentiometer $R_{21}$ delivered from the servo amplifier 59 will be less than it would be if potentiometer $R_{19}$ was not in the circuit. Hence, the servo-valve will not open as wide and retraction of the tool from the workpiece will be slower.

Also, since gap current increases as gap voltage decreases, and vice versa, changes in gap voltage are partially offset by changes in gap current as measured across potentiometer $R_{19}$, and changes in the resultant voltage appearing across potentiometer $R_{20}$ are accordingly smaller. Hence, the sensitivity may be "turned up," i.e., the setting of sensitive potentiometer $R_{20}$ may be increased to select a larger portion of the voltage appearing thereon. This is advantageous since it results in faster reaction of the servo-feed apparatus to tool-out-of-cut and shorted gap conditions when the voltage across potentiometer $R_{19}$ drops to zero. The amount of increase of sensitivity which is possible will depend on the setting of potentiometer $R_{19}$. That is, by increasing the amount of voltage inserted by this potentiometer, i.e., by increasing the amount of "differential" effect produced by the current responsive voltage, the amount by which the sensitivity may be increased will be augmented.

While in the foregoing description the invention has been described in connection with one possible form or embodiment thereof and certain specific terms and language have therefore been used herein, it is to be understood that the present disclosure is illustrative rather than restrictive and that changes and modifications may be resorted to without departing from the limits of the invention as defined by the claims which follow.

What is claimed is:

1. A spark discharge machining apparatus comprising a pair of electrodes separated by a spark gap, one of said electrodes consisting of a tool and the other of a workpiece, a capacitor connected across said electrodes, and means to charge said capacitor to the ignition potential of the gap between said electrodes, including a source of direct-current potential having positive and negative end terminals and a mid tap adapted to provide a potential intermediate that existing between said end terminals, a resistor and a diode connected in series between one of said end terminals and said mid tap, said resistor and diode being connected together by a junction and said diode being poled to permit current to flow from said source through said resistor, and a transistor having emitter and collector electrodes connected in series with said capacitor between said junction and the other of said end terminals of said source, whereby the potential on the transistor is limited to the potential between said mid tap and said other end terminal, and the current flow through the transistor is limited by the impedance of said resistor.

2. The spark discharge machining apparatus of claim 1 wherein said transistor includes a base electrode, a source of bias potential connected between said base electrode and said emitter electrode, and means, including a second transistor, for controlling the application of said bias potential to said base and emitter electrodes to thereby determine the conducting or non-conducting state of said first-mentioned transistor.

3. The spark discharge machining apparatus of claim 2 including means to change the conducting or non-conducting state of said second transistor in response to changes in the flow of current through the spark gap.

4. A spark discharge machining apparatus comprising a pair of sparking electrodes separated by a gap, one of said electrodes comprising a tool and the other a workpiece, a capacitor connected across said electrodes, and means to charge said capacitor to the ignition potential of the gap, including a source of direct-current potential having positive and negative end terminals and a mid tap adapted to provide a potential intermediate that of the end terminals, a plurality of series-connected resistor and diode pairs connected between one of said end terminals and said mid tap, the resistor and diode of each pair being connected together at a junction and said diode of each pair being poled to permit current to flow from said source through its associated resistor, a connection between the other of said end terminals and one of said sparking electrodes, and a plurality of transistors each having emitter and collector electrodes connected in series between one of said junctions and the other of said sparking electrodes, whereby the potential on each transistor is limited to the potential between said mid tap and said other end terminal, and the current through the transistor is limited by the impedance of its associated resistor.

5. The spark discharge machining apparatus of claim 4 including a resistor connected in circuit with the emitter electrode of each of said transistors for stabilizing the bias on each transistor and for distributing the load more uniformly between the transistors.

6. A spark discharge machining apparatus comprising a pair of electrodes separated by a spark gap, one of said electrodes comprising a tool and the other a workpiece, a capacitor, a charging circuit for said capacitor adapted to raise the potential of said capacitor to the ignition potential of the spark gap, selectively operable means to disconnect said charging circuit from said capacitor, a discharge circuit connecting said capacitor with said electrodes for discharging the energy stored in said capacitor through the spark gap, and means responsive to a change in the flow of current through said discharge circuit for causing said selectively operable means to disconnect the charging circuit from said capacitor.

7. A spark discharge machining apparatus comprising a pair of electrodes separated by a spark gap, one of said electrodes comprising a tool and the other a workpiece, a capacitor, a charging circuit for said capacitor adapted to raise the potential of said capacitor to the ignition potential of the spark gap, said circuit including a series-connected transistor for connecting the charging circuit to and disconnecting it from said capacitor, a discharge circuit connecting said capacitor with said electrodes for discharging the energy stored in said capacitor through the spark gap, and means, including a second transistor operating in response to a change in the flow of current through said discharge circuit for causing said first-mentioned transistor to disconnect said charging circuit from the capacitor in response to an increase in the flow of current through said discharge circuit.

8. A spark discharge machining apparatus comprising a pair of electrodes separated by a spark gap, one of said electrodes comprising a tool and the other a workpiece, a capacitor, a charging circuit for said capacitor adapted to raise the potential of said capacitor to the ignition potential of the spark gap, said circuit including a series-connected transistor for connecting the charging circuit to and disconnecting it from said capacitor, a discharge circuit connecting said capacitor with said electrodes for discharging the energy stored in said capacitor through the spark gap, means to bias said transistor on and off to thereby connect the charging circuit to and disconnect it from said capacitor, a second transistor, means to produce a control potential for said second transistor in response to a change in the flow of current through said discharge circuit, and means rendered effective by said second transistor in response to the application of said control potential thereto to cause said bias means to turn off said first-mentioned transistor and disconnect the charging circuit from said capacitor.

9. A spark discharge machining apparatus comprising a pair of electrodes separated by a spark gap, one of said electrodes comprising a tool and the other a workpiece, a capacitor, means to charge said capacitor to the ignition potential of the spark gap, including a source of direct-current potential and a first transistor for selectively disconnecting said source from said capacitor, a discharge circuit connecting said capacitor with said electrodes for discharging the energy stored in said capacitor through the spark gap, means operating in response to a change in the flow of current through said discharge circuit for causing said transistor to disconnect said source from said capacitor upon an increase in the flow of current through said discharge circuit, a second transistor for controlling the operation of said first transistor, and means for causing said second transistor to turn off said first transistor and thereby disconnect said source from said capacitor when the voltage across the gap falls below a predetermined minimum value, said means including a source of reference voltage, a circuit for comparing the potential of said source of reference voltage with the voltage across the spark gap, and connections from said circuit to said second transistor to apply a control voltage thereto when the voltage across the gap falls below said predetermined value.

10. The spark discharge machining apparatus of claim 9 wherein said comparing circuit includes an impedance unit connected between said source of reference voltage and one of said electrodes, and means to derive from said unit a control voltage representing a portion of the voltage drop appearing thereacross.

11. The spark discharge machining apparatus of claim 9 wherein said comparing circuit includes a non-linear impedance unit connected between said source of reference voltage and one of said electrodes, and means to derive from said unit a control voltage representing a variable portion of the voltage drop appearing thereacross.

12. A spark discharge machining apparatus comprising a pair of electrodes separated by a spark gap, one of said electrodes comprising a tool and the other a workpiece, circuit means to charge said electrodes to the ignition potential of the spark gap, a power supply adapted to provide direct current at a potential lower than the extinguishing potential of the spark gap, a variable resistance unit, means connecting said unit and said power supply in series with the spark gap, and means to disconnect said charging circuit from said electrodes and to lower the value of said variable resistance unit when the voltage across the spark gap falls below that provided by said power supply.

References Cited by the Examiner
UNITED STATES PATENTS

| | | | |
|---|---|---|---|
| 2,773,168 | 12/1956 | Williams | 219—113 X |
| 2,804,575 | 8/1957 | Matulaitis | 315—173 |
| 2,827,595 | 3/1958 | Bruma et al. | 315—227.1 |
| 2,866,921 | 12/1958 | Matulaitis | 315—127 |
| 2,979,639 | 4/1961 | Williams et al. | 315—227.1 |
| 2,984,761 | 5/1961 | Webb | 314—61 |
| 2,996,638 | 8/1961 | Webb | 314—61 |
| 3,018,411 | 1/1962 | Webb | 315—227.1 |
| 3,032,664 | 5/1962 | Rowe | 307—88.5 |

JAMES W. LAWRENCE, *Primary Examiner.*

RALPH G. NILSON, DAVID J. GALVIN, *Examiners.*

C. R. CAMPBELL, JR., S. SCHNEEBERGER,
*Assistant Examiners.*